United States Patent [19]
Kingston et al.

[11] Patent Number: 5,931,268
[45] Date of Patent: Aug. 3, 1999

[54] ELECTRICAL ACTUATION MECHANISM SUITABLE FOR A DISC BRAKE ASSEMBLY

[75] Inventors: Andrew W. Kingston, Heidesheim; Robert L. Ferger, Bad Homburg; Thomas Weigert, Bad Soden; Salvatore Oliveri, Filsen, all of Germany; Leonard Tribe, Sidmounth, United Kingdom; Herbert L. Linkner, Dexter, Mich.

[73] Assignee: Kelsey-Hayes Company, Livonia, Mich.

[21] Appl. No.: 08/800,349

[22] Filed: Feb. 14, 1997

Related U.S. Application Data

[60] Provisional application No. 60/011,679, Feb. 15, 1996, and provisional application No. 60/024,970, Aug. 30, 1996.

[51] Int. Cl.$^6$ ...................................................... B60J 13/74
[52] U.S. Cl. .......................... 188/162; 188/158; 188/72.3; 188/196 V
[58] Field of Search ............................ 74/89.15, 424.8 R, 74/424.8 B, 424.8 C; 188/71.9, 72.1, 72.3, 72.6, 72.8, 156, 158, 161–163, 196 A, 196 V; 318/370–372; 464/87, 89, 91, 150; 403/225–226, 227; 310/92, 93, 95, 96

[56] References Cited

U.S. PATENT DOCUMENTS

| | | | |
|---|---|---|---|
| 2,004,712 | 6/1935 | Thiry ......................................... | 464/87 |
| 3,080,735 | 3/1963 | Blom, Jr. ................................... | 464/89 |
| 3,505,813 | 4/1970 | McCarthy . | |

(List continued on next page.)

FOREIGN PATENT DOCUMENTS

| | | |
|---|---|---|
| 0 242 521 B1 | 10/1988 | European Pat. Off. . |
| 0 238 921 B1 | 10/1989 | European Pat. Off. . |
| 0 296 376 B1 | 7/1991 | European Pat. Off. . |

(List continued on next page.)

OTHER PUBLICATIONS

Article (ATZ Automobil Technische Zeitschrift, Jun. 1996, pp. 328–333) "Konzept für elektromechanische Fahrzeugbremse" (no translation).

Two photographs of ITT Automotive electric brake unit displayed at IAA Frankfurt (auto show) Sep. 1995.

(List continued on next page.)

*Primary Examiner*—Chris Schwartz
*Attorney, Agent, or Firm*—MacMillan, Sobanski & Todd, LLC

[57] ABSTRACT

An improved structure for an electrical actuation mechanism adapted for use in a disc brake assembly includes an electrical actuation mechanism adapted to be secured to an inboard leg of the caliper of the disc brake assembly. The electrical actuation mechanism includes a housing, an electrical motor disposed in the housing, and a spindle disposed in the housing and operatively coupled to the motor by a conversion gear assembly which is effective to convert rotary motion generated by the motor into axial movement of the piston. The spindle includes a shaft and a piston which can be coupled to the shaft by a dampening structure. The shaft is operatively connected to the motor for axial motion thereof, and the piston is operatively connected to a friction pad for engaging a rotor attached to a wheel of a vehicle in which the disc brake assembly is installed. The dampening structure can be comprised of elastomeric material or a fluid filled chamber defined between the piston and the shaft. The dampening structure reduces the radial loads acted upon the piston from being transmitted to the shaft. The electrical actuation mechanism may also be equipped with sensors for sensing the axial position of the piston, a clutch, to couple and uncouple the electric motor from the conversion gear assembly, and a mechanism which prevents back drive motion of the electrical motor.

14 Claims, 7 Drawing Sheets

U.S. PATENT DOCUMENTS

| | | |
|---|---|---|
| 3,526,092 | 9/1970 | Steel . |
| 3,909,085 | 9/1975 | Wilkinson et al. . |
| 4,492,518 | 1/1985 | Neal . |
| 4,537,289 | 8/1985 | VonGrünberg et al. ............ 188/264 G |
| 4,602,702 | 7/1986 | Ohta et al. . |
| 4,658,939 | 4/1987 | Kircher et al. . |
| 4,756,391 | 7/1988 | Agarwal et al. . |
| 4,764,152 | 8/1988 | Jorg ........................................... 464/87 |
| 4,793,447 | 12/1988 | Taig et al. . |
| 4,804,073 | 2/1989 | Taig et al. . |
| 4,836,338 | 6/1989 | Taig . |
| 4,850,457 | 7/1989 | Taig . |
| 4,926,708 | 5/1990 | Dietrich et al. . |
| 5,000,523 | 3/1991 | Mikhaeil-Boules et al. . |
| 5,107,967 | 4/1992 | Fujita et al. . |
| 5,127,316 | 7/1992 | Ishiwata et al. .......................... 464/89 |
| 5,219,048 | 6/1993 | Shaw et al. . |
| 5,468,058 | 11/1995 | Linkner, Jr. . |
| 5,484,193 | 1/1996 | Fuller et al. . |
| 5,575,358 | 11/1996 | McCormick ........................ 188/264 G |

FOREIGN PATENT DOCUMENTS

| | | |
|---|---|---|
| 0 319 750 B1 | 8/1991 | European Pat. Off. . |
| 0636 218 B1 | 10/1993 | European Pat. Off. . |
| 121043 | of 1899 | Germany . |
| 36 05 616 A1 | 8/1987 | Germany . |
| 36 11 251 A1 | 10/1987 | Germany . |
| 36 34 894 A1 | 12/1987 | Germany . |
| 36 41 656 C3 | 6/1988 | Germany . |
| 37 10 444 A1 | 10/1988 | Germany . |
| 37 39 684 A1 | 6/1989 | Germany . |
| 39 08 225 A1 | 9/1990 | Germany . |
| 40 24 257 A1 | 2/1992 | Germany . |
| 43 18 334 A1 | 12/1994 | Germany . |
| 195 11 287 A1 | 1/1996 | Germany . |
| 195 43 098 A1 | 12/1996 | Germany . |
| 195 43 098 C2 | 12/1996 | Germany . |
| WO 96/03301 | 2/1996 | WIPO . |

OTHER PUBLICATIONS

Brochure ("Wittenstein Motion Control GmbH") publication date prior to May 1996. (no translation).

Article (Design Engineering, Jun. 1995, pp. 13) "Germans get down to the nuts and bolts of motion control".

Brochure ("INA Lineartechnik", p. 10) publication date unknown (no translation).

Brochure: Deutsche Forschungsanstalt für Luft–und Raumfahrt e.V. (DLR)—Institute for Robotics and Systems Dynamics "Artificial muscle® and 'programmable spring' based on DLR's planetary roller screw drive", publication date prior to May 1996.

Schenk, D.E.; Wells, R.L.; Miller, J.E.: Intelligent Braking for Current and Future Vehicles, Society of Automotive Engineers (SAE) Technical Paper 950762, Feb. 27, 1995.

Bill, K.; Grundsatzuntersuchungen zum Einsatz elektrischer Radbremsen in Personen–kraftfahrzeugen, Fortschr.–Ber, VDI Reihe 12 Nr. 166, VDI Verlag, 1992 (no translation).

Mitshcke, M.; Braun, H.; Czinczel, A.; Goktan, A.; Syta, S.: Antropotechnische Optimierung von PKW–Bremsen, Teil 1, Bosch Technn. Berichte 8, pp. 265–276. 1986/87 (no translation).

Ehlers, K.: Stellglieder in der Kraftfahrzeugtechnik, ETC–Fachbericht 22, VDE–Verlag, pp. 151–174, 1988 (no translation).

Bohm, J.: Kraft–und Positionsregelung von Industrierobotern mit Hilfe von Motorsignalen, Fortschr.–Ber, VDI Reihe 8 Nr. 405, VDI–Verlag, 1994. (no translation).

Wells, R.L.; Miller, J.E.: Electric Brake System for Passenger Vehicles—Ready for production, ISATA, Paper 93 ME 115, Aachen, pp. 349–356, 1993.

ELECTRICAL ACTUATION MECHANISM SUITABLE FOR A DISC BRAKE ASSEMBLY

CROSS REFERENCE TO RELATED APPLICATIONS

This application claims the benefit of U.S. Provisional Application No. 60/011,679 filed Feb. 15, 1996 and U.S. Provisional Application No. 60/024,970 filed Aug. 30, 1996.

BACKGROUND OF THE INVENTION

This invention relates in general to actuator mechanism and in particular to an improved electrical actuation mechanism adapted for use in a vehicle disc brake assembly.

Electric motors are convenient and well known devices for converting electrical power into motion. The rotary motion produced by electric motors can be converted into a linear motion, which is more useful in certain situations, in a number of ways. One actuator device which is known for converting rotary motion into linear motion is the spindle gear mechanism disclosed in U.S. Pat. No. 4,926,708 to Dietrich et al, the disclosure of which is incorporated by reference herein.

Most vehicles are equipped with a brake system for retarding or stopping movement of the vehicle in a controlled manner. A typical brake system for an automobile or light truck includes a disc brake assembly for each of the front wheels and either a drum brake assembly or a disc brake assembly for each of the rear wheels. The brake assemblies are actuated by hydraulic, pneumatic, or electrical mechanisms when an operator of the vehicle depresses a brake pedal.

A typical disc brake assembly includes a rotor which is secured to the wheel of the vehicle for rotation therewith. A caliper assembly is slidably supported by pins secured to an anchor plate. The anchor plate is secured to a non-rotatable component of the vehicle, such as the steering knuckle in a front wheel drive vehicle. The caliper assembly includes a pair of brake shoes which are disposed on opposite sides of the rotor. The brake shoes are operatively connected to one or more hydraulically, pneumatically, or electrically actuated pistons for movement between a non-braking position, wherein they are spaced apart from opposed axial sides or braking surfaces of the rotor, and a braking position, wherein they are moved into frictional engagement with the opposed braking surfaces of the rotor. When the operator of the vehicle depresses the brake pedal, the piston urges the brake shoes from the non-braking position to the braking position so as to frictionally engage the opposed braking surfaces of the rotor and thereby slow or stop the rotation of the associated wheel of the vehicle.

BRIEF SUMMARY OF THE INVENTION

This invention relates to an improved structure for an electrical actuation mechanism adapted for use in a disc brake assembly. The electrical actuation mechanism is adapted to be secured to an inboard leg of the caliper of the disc brake assembly, and includes a housing, an electrical motor disposed in the housing, and a spindle disposed in the housing and operatively coupled to the motor by a conversion gear assembly which is effective to convert rotary motion generated by the motor into axial movement of the spindle. The spindle is operatively connected to friction pads which engage a rotating rotor, thereby braking the associated wheel. The conversion gear assembly preferably includes a planetary roller arrangement in which the rotational motion of the motor is imparted on a spindle nut which rotates a plurality of planetary rollers about a spindle, thereby imparting axial motion thereof.

The electrical actuation mechanism can be equipped with sensors for sensing the axial position of the piston which can be used to determine the brake pressure applied. The electrical actuation mechanism may include a clutch which couples and uncouples the output of the electrical motor from the conversion gear assembly to permit rapid acceleration of the motor to a high speed. Once the motor is operating at a high speed, the clutch can be engaged to operate the conversion gear assembly to quickly apply the vehicle brakes, resulting in an quicker overall response. The electrical actuating mechanism may also include a brake mechanism which prevents back-drive motion of the gear mechanism when the electrical motor is not driving the gear mechanism.

In one embodiment of the invention, the electrical actuation mechanism includes a spindle having a piston, which is operatively connected to a friction pad, and a shaft which is operatively connected to the conversion gear assembly. The piston and shaft are coupled together by a dampening structure which reduces the radial loads acted upon the piston from being transmitted to the shaft. The dampening structure can be comprised of an elastomeric material or may be a fluid filled chamber arrangement defined between the piston and the shaft.

Various objects and advantages of this invention will become apparent to those skilled in the art from the following detailed description of the preferred embodiment, when read in light of the accompanying drawings.

DETAILED DESCRIPTION OF THE INVENTION

Figure 1:
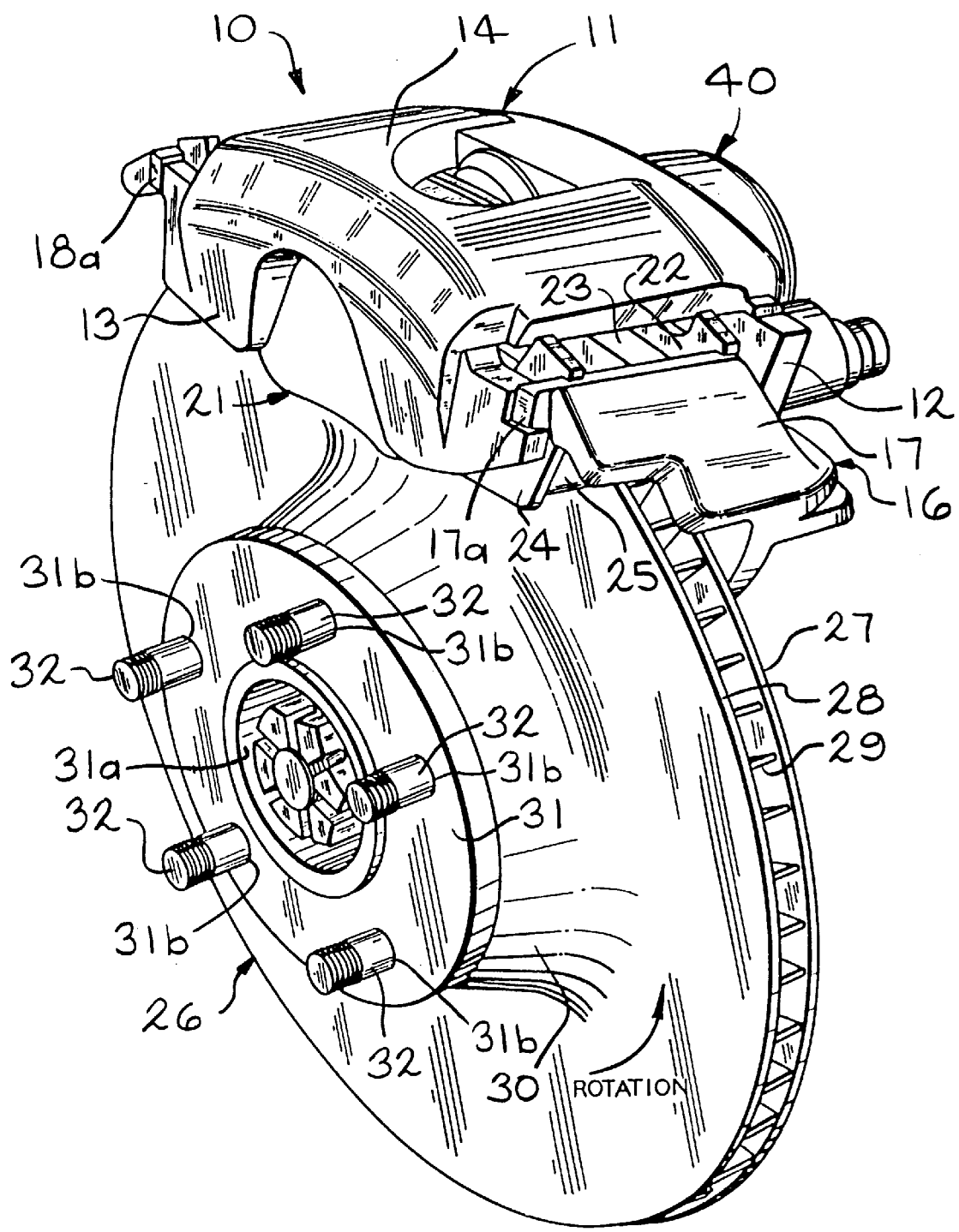
FIG. 1 is a perspective view of a portion of a vehicle disc brake assembly including an improved electrical actuation mechanism in accordance with this invention.
Figure 2:
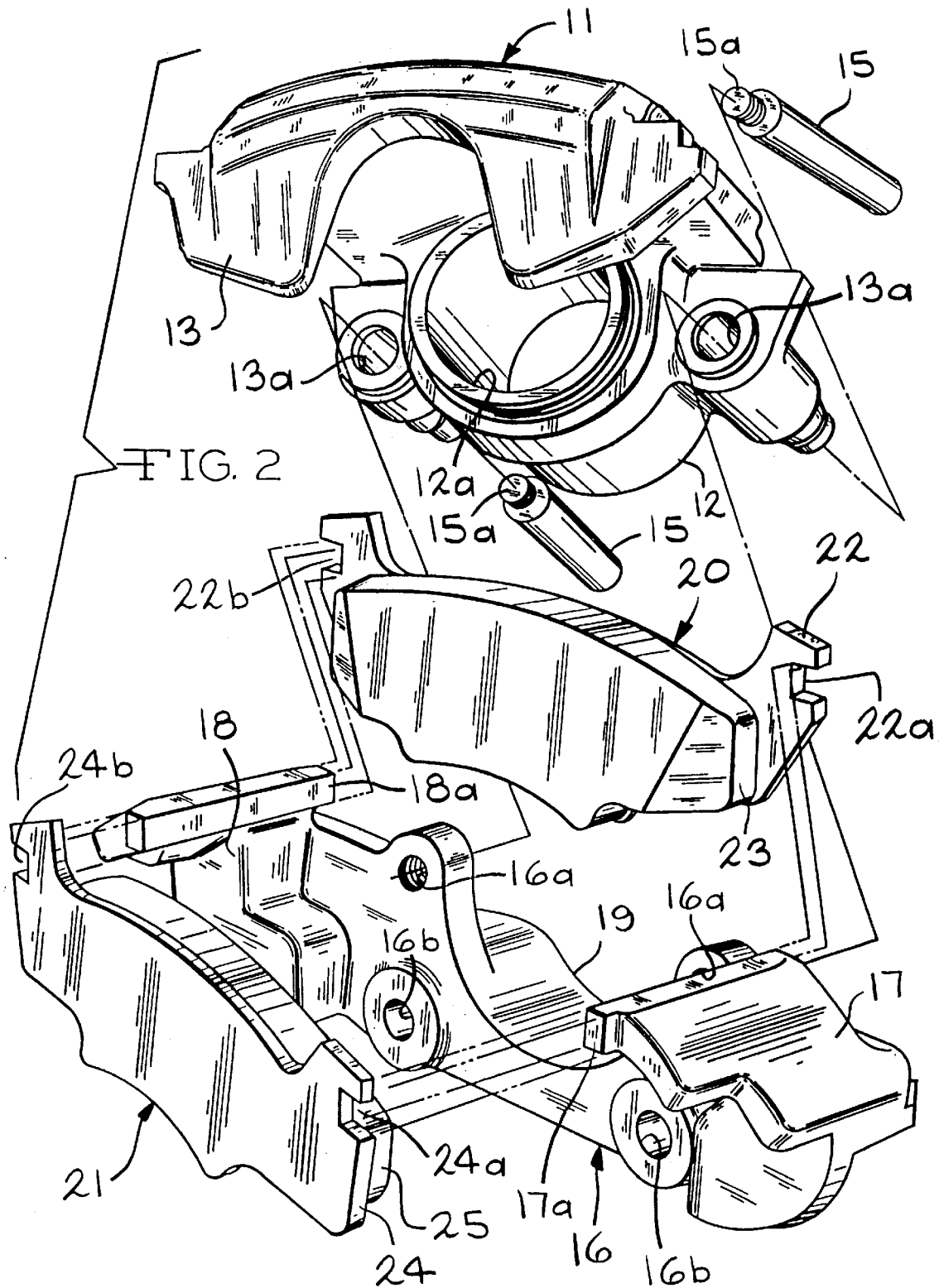
FIG. 2 is an exploded perspective view of a portion of the vehicle disc brake assembly illustrated in FIG. 1.
Figure 3:
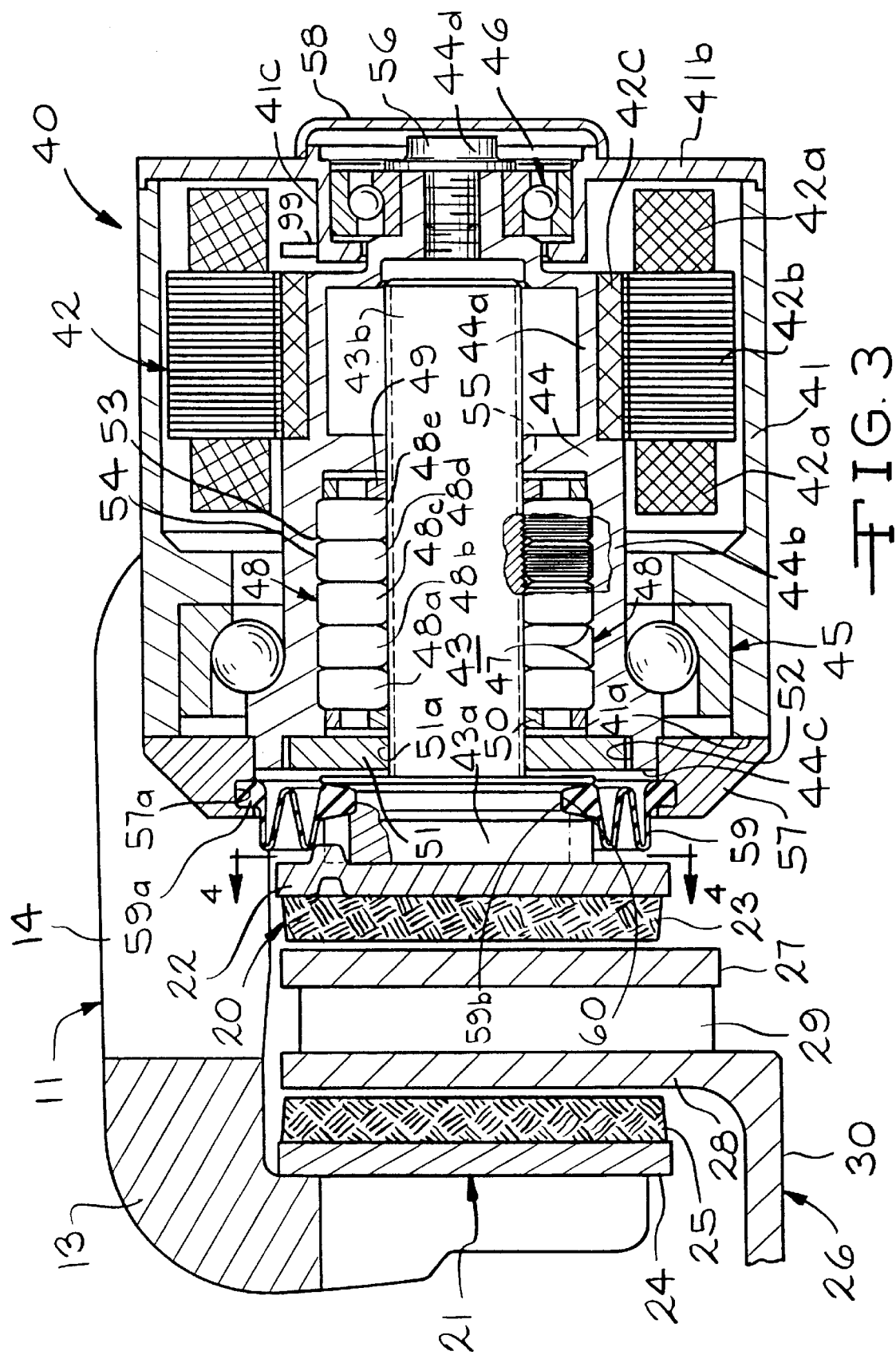
FIG. 3 is a sectional view of a portion of the vehicle disc brake assembly illustrated in FIG. 1.

Referring now to the drawings, there is illustrated in FIGS. 1 through 3 a portion of an electrically actuated vehicle disc brake assembly, indicated generally at 10, in accordance with this invention. The general structure and operation of the disc brake assembly 10 is conventional in the art. Thus, only those portions of the disc brake assembly 10 which are necessary for a full understanding of this invention will be explained and illustrated.

The disc brake assembly 10 includes a generally C-shaped caliper, indicated generally at 11. The caliper 11 includes an inboard leg portion 12 and an outboard leg portion 13 which are interconnected by an intermediate bridge portion 14. The caliper 11 is slidably supported on a pair of pins 15 secured to an anchor plate, indicated generally at 16. The pins 15 extend through respective non-threaded apertures 13a formed through the inboard leg 13 of the caliper 11. The pins 15 have externally threaded ends 15a which are received in respective internally threaded apertures 16a formed in the anchor plate 16. The pins 15 permit the caliper 11 to slide in both the outboard direction (toward the left when viewing FIG. 3) and the inboard direction (toward the right when viewing FIG. 3). Such sliding movement of the caliper 11 occurs when the disc brake assembly 10 is actuated, as will be explained below. A pair of bolts (not shown) extend through respective non-threaded apertures 16b formed through the anchor plate 16 to secure the anchor plate 16 to a non-rotatable component of the vehicle, such as the steering knuckle (not shown) in a front wheel drive vehicle.

As best shown in FIG. 2, the illustrated anchor plate 16 includes a pair of outwardly extending arms 17 and 18 which are interconnected by an inner tie bar 19. The arms 17 and 18 have upstanding guide rails 17a and 18a, respectively formed thereon. The guide rails 17a and 18a extend transverse to the arms 17 and 18 and parallel to one another. The guide rails 17a and 18a are provided to slidably support an inboard brake shoe, indicated generally at 20, and an outboard brake shoe, indicated generally at 21.

The inboard brake shoe 20 includes a backing plate 22 and a friction pad 23. The opposed ends of the inboard backing plate 22 have notches 22a and 22b formed therein for supporting the inboard brake shoe 20 on the guide rails 17a and 18a of the anchor plate 16. The outboard brake shoe 21 includes a backing plate 24 and a friction pad 25. The opposed ends of the outboard backing plate 24 have notches 24a and 24b formed therein for supporting the outboard brake shoe 21 on the guide rails 17a and 18a of the anchor plate 16.

The disc brake assembly 10 further includes a rotor, indicated generally at 26, which is connected to a wheel (not shown) of the vehicle for rotation therewith. The illustrated rotor 26 is ventilated and includes a pair of opposed friction plates 27 and 28 which are spaced apart from one another by a plurality of intermediate ribs or posts 29 in a known manner. The rotor 26 extends radially outwardly between the inboard friction pad 23 and the outboard friction pad 25. The friction plate 28 is connected by a circumferentially extending wall 30 to an inner mounting flange portion 31. The inner mounting flange portion 31 includes a centrally located pilot hole 31a which defines an axis of rotation for the rotor 26. A plurality of lug bolt receiving holes 31b (five of such lug bolt receiving holes 31b are shown in FIG. 1) are equally spaced circumferentially on the rotor 26 about the pilot hole 31a. A lug bolt 32 extends through each of the lug bolt receiving holes 31b for mounting and securing the rotor 26 to the vehicle wheel.

The disc brake assembly 10 further includes an electrical actuation mechanism, indicated generally at 40 in FIGS. 1 and 3, for effecting the operation of the disc brake assembly 10 under normal operating conditions. Preferably, the electrical actuation mechanism 40 is a sealed-for-life assembly. The electrical actuation mechanism 40, as shown in FIG. 3, includes a housing 41 which is partially received in an annular opening 12a, as shown in FIG. 2, formed in the inboard leg 12 of the caliper 11. The electrical actuation mechanism 40 further includes an electric motor 42 disposed within the housing 41, and a spindle 43 operatively coupled to the motor 42 by a motor output shaft 44. The housing 41 can be secured to the caliper 11 by any suitable means, such as for example, by using threaded fasteners (not shown).

The illustrated electrical motor 42 is a brushless DC motor and includes coils 42a, a stator 42b, and magnets 42c. The spindle 43 includes an outboard portion 43a and a reduced diameter inboard portion 43b. As will be discussed in detail below, the inboard portion 43b of the spindle 43 is operatively coupled to the motor 42 so as to move axially within the housing 41 when the motor 42 is actuated. The outboard portion 43a defines a piston of the electrical actuation mechanism 40 and is adapted to engage the inboard backing plate 22 of brake shoe 20. Although the brake shoe 20 is shown and described as being supported by the guide rail 17a of the anchor plate 16, as shown in FIG. 2, the brake shoe 20 can be mounted on the outboard portion 43a of the spindle 43. The brake shoe 21 can then be mounted on the inboard leg 13 of the caliper 11. The output shaft 44 is supported in the housing 41 by a pair of bearings 45 and 46. The output shaft 44 includes an inboard portion 44a which is coupled to the magnets 42c by suitable means, such as, for example, by an adhesive or a binding band, to thereby effectively couple the output shaft 44 to the motor 42 for rotary motion when the motor 42 is actuated. The output shaft 44 also includes an outboard portion 44b which defines a spindle nut and is provided with internal threads 47.

A plurality of planetary rollers 48 are interposed between the spindle nut 44b of the output shaft 44 and the spindle 43. A pair of roller guides 49 and 50 are disposed within the spindle nut 44b between the opposed ends of the planetary rollers 48. The planetary rollers 48 are spaced circumferentially about, and parallel to, the inboard portion 43b of the spindle 43.

A washer 51 is provided having an annular opening 51a formed therein. The opening 51a of the washer is slightly larger than an outer diameter defined by the reduced diameter portion 43b of the spindle 43 to allow the spindle portion 43a to extend through the washer opening 51a. The washer 51 is disposed and retained in an annular recess 52 formed adjacent an outboard end 44c of the output shaft 44 by suitable means, such as for example, by threads.

In the embodiment illustrated in FIG. 3, each of the plurality of planetary rollers 48 are divided into a plurality of sections, of which there are five sections 48a through 48e shown in FIG. 3. The outer surface of the planetary rollers 48 are provided with parallel-spaced first external grooves 53 formed between adjacent roller sections 48a through 48e. The outer surface of the planetary rollers 48 are further provided with a plurality of parallel-spaced second external grooves 54 formed along the outer surface of each section 48a through 48e of the rollers 48. The distance or pitch between adjacent first external grooves 53 is larger than the pitch between adjacent second external grooves 54. The pitch of the first external grooves 53 is, therefore, relatively coarse compared to the pitch of the second external grooves 54 which is relatively fine. The first external grooves 53 of the rollers 48 are effective to operatively engage the relatively coarse internal threads 47 of the spindle nut 44b of the output shaft 44, and the second external grooves 54 of the rollers 48 are effective to operatively engage the relatively fine external threads 55 provided on the outer surface of the reduced diameter portion 43b of the spindle 43. As a result, the planetary rollers 48 are effective to operatively couple the motor output shaft 44 to the spindle 43, thereby converting the rotary motion of the output shaft 44 of the motor 42 into axial movement of the spindle 43. The spindle shaft 43, the planetary rollers 48 and the spindle nut 44b form a conversion gear assembly for converting rotary motion into linear motion which is similar to the nut rolling spindle assembly disclosed in U.S. Pat. No. 4,926,708 to Dietrich et al. Suitably, the contour of the respective threads and grooves of the output shaft 44, planetary rollers 48, and spindle nut 44b of the electrical actuation mechanism 40 may be similar to that of the nut rolling spindle assembly disclosed in U.S. Pat. No. 4,926,708.

The electric actuation mechanism 40 further includes a screw 56, a front cover 57, a rear cover 58, and a dust boot seal 59. The screw 56 is disposed in an opening provided in an inboard end 44d of the output shaft 44, and is used for positioning of the bearing 46. The front cover 57 is disposed adjacent an outboard end 41a of the housing 41 and retained thereon by suitable means, such as for example, by a circlip with or without preload screws. The rear cover 58 is disposed adjacent the inboard end 41b of the housing 41 and retained thereon by suitable means, such as for example, by a screw or an adhesive. The dust boot seal 59 is preferably formed from a flexible material and has a first end 59a which is disposed in an annular recess 57a provided in the cover 57, and a second end 59b which is disposed in an annular recess 60 provided in the outboard portion 43a of the spindle 43. A plurality of flexible convolutions are provided in the dust boot seal 59 between the first and second ends thereof. The dust boot seal 59 is provided to prevent water, dirt, and other contaminants from entering into the electrical actuation mechanism 40.

Figure 4:
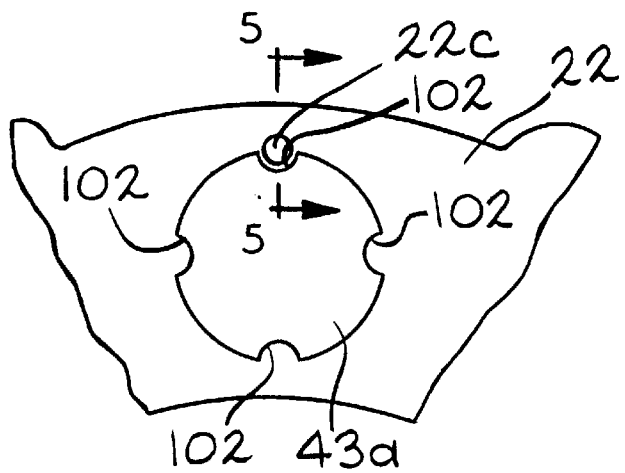
FIG. 4 is a view taken along line 4—4 of FIG. 3.
Figure 5:
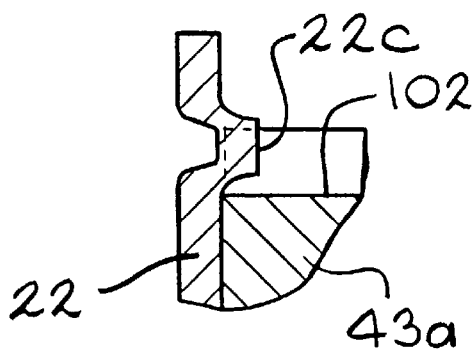
FIG. 5 is a view taken along line 5—5 of FIG. 4.

The disc brake assembly 10 includes structural elements to ensure that the spindle 43 does not rotate with the rollers 48, but rather is fixed against rotation, so that the spindle 43 is forced into linear motion by rotation of the rollers 48. One suitable structure for accomplishing this is shown in FIGS. 3, 4, and 5. As shown therein, the inboard backing plate 22 is provided with a projection in the form of a boss 22c, and the outboard piston portion 43a of the spindle 43 is provided with a plurality of recesses 102. The boss 22c of the backing plate 22 is received in one of the recesses 102 of the piston portion 43a of the spindle 43 to positively couple the spindle 43 to the backing plate 22 and prevent rotation of the spindle 43. If desired, multiple bosses 22c can be formed on the backing plate 22 and engaged with cooperating recesses 102 formed on the piston portion 43a.

When servicing the disc brake assembly 10, the bosses 22c and the recesses 102 can be utilized to adjust for wear of the friction pads 23 and 25 by rotating the spindle 43 in a direction to axially move the spindle in the outboard direction (toward the left when viewing FIG. 3) and aligning the boss 22c with a sufficiently positioned recess 102. The spindle 43 can, therefore, be moved to any axial position corresponding with the decreasing widths of the friction pads 23 and 25.

When it is desired to actuate the disc brake assembly 10 to slow or stop the rotation of the rotor 26 and the vehicle wheel associated therewith, the driver of the vehicle depresses the brake pedal (not shown). The depression of the brake pedal generates an electrical signal which is operative to actuate the disc brake assembly 10. In particular, the signal actuates the motor 42 which rotates the output shaft 44 and imparts rotary motion to the rollers 48 which in turn, axially move the spindle 43 (toward the left when viewing FIG. 3). The axial movement of the spindle 43 causes the outboard portion 43a to engage the backing plate 22 of the inboard brake shoe 20. As a result, the friction pad 23 of the inboard brake shoe 20 is moved into frictional engagement with the inboard friction plate 27 of the rotor 26. At the same time, the caliper 11 slides on the pins 15 in the inboard direction (toward the right when viewing FIG. 3) such that the outboard leg 13 thereof moves the friction pad 25 of the outboard brake shoe 21 into frictional engagement with the outboard friction plate 28 of the rotor 26. As a result, the opposed friction plates 27 and 28 of the rotor 26 are frictionally engaged by the friction pads 23 and 25.

By utilizing the planetary rollers 48, the output shaft 44, and the spindle 43 (similar to the nut rolling spindle assembly described in U.S. Pat. No. 4,962,708 to Dietrich et al.) a relatively small pitch, down to a minimum of 0.1 mm, can be realized. As a result, this reduces the amount of torque that the motor 42 must supply. Therefore, a high speed, low torque motor can be used to achieve the same time response as a low speed, high torque motor. Frequently, a high speed, low torque motor may be smaller and less costly than a low speed, high torque motor.

To release the braking force, an electrical signal is sent to actuate the motor 42 in the reverse direction, thereby withdrawing the friction pads 23 and 25 from the friction plates 27 and 28, respectively. This electrical signal can be triggered by sensing the release of the brake pedal or sent by a control logic module used, for instance, by an anti-lock braking system.

Although the electrical actuation mechanism 40 is illustrated and described as having a conversion gear assembly including dual grooved planetary rollers 48, an internally threaded output shaft 44, and an externally threaded spindle 43, the electrical actuating mechanism 40 can have any suitable conversion gear assembly which converts the rotary motion of a motor to an axial motion for effective operation of the disc brake assembly 100.

Preferably, the electrical actuation mechanism 40 includes a plurality of sensors 99 (only one of such sensors 99 being shown in FIG. 3) for measuring the rotation angle of the motor output shaft 44 and magnets 42c. The sensors 99 can be positioned on a portion 41c of the housing 41 adjacent the bearing 46. By sensing the rotation of the motor output shaft 44, the axial position of the spindle 43 can be determined. Brake force is a known function of the axial position of the spindle. Therefore, the sensors 99, with the appropriate control logic, can be used to determine the applied brake pressure. The electrical signal actuating the motor 42 can then be modified to alter the output of the motor 42 to change the brake force as desired. Of course, the electrical actuation mechanism 40 can be adapted for use with any other suitable type of sensor arrangement. For example, counting the excitation pulses of an electronically commutated motor will provide indication of relative axial position of the spindle 43.

Figure 6:
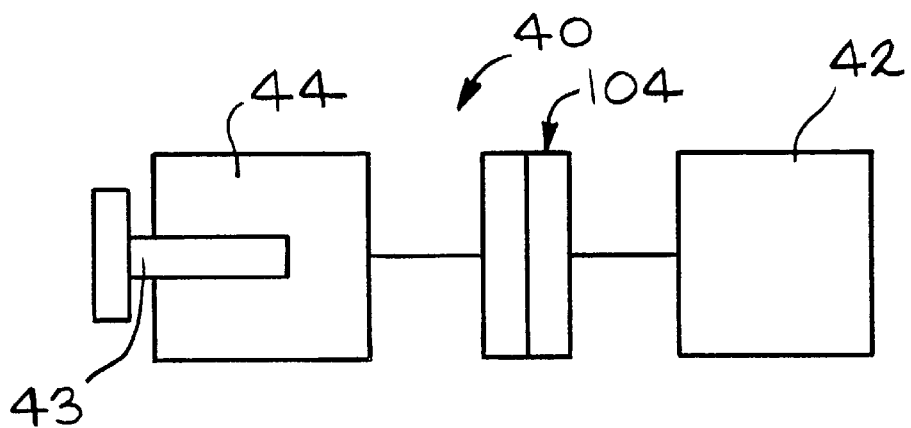
FIG. 6 is a block diagram of an embodiment of a vehicle disc brake assembly and electrical actuation mechanism similar to that shown in FIGS. 1 through 3 but having an electric clutch.

FIG. 6 is a block diagram of the electrical actuation mechanism 40 having an electrically energized clutch mechanism 104. In certain brake applications, it may be desirable to incorporate the clutch 104 for reasons which are explained below.

The clutch 104 is connected between the motor 42 and the output shaft 44. When energized, the clutch 104 couples the motor 42 to the output shaft 44 by frictional means which are well known in the art. When the motor 42 is initially rotated, the inertia of all the engaged rotating members (such as the output shaft 44, the magnets 42c, the planetary rollers 48, and the bearings 45 and 46) hinders the start-up speed of the motor 42. The inertia of the rotating components of the motor 42 causes a lag time during start-up and stopping of the rotation of the motor 42, and also between forward rotation and immediate backward rotation of the motor 42. The use of the clutch 104, as will be explained in detail below, is advantageous because it can initially reduce the inertia of mass to increase the start-up time of the motor 42 and decrease the lag time. This reduction in the lag time is desirable for actuating the brake disc assembly 10 during an anti-lock brake system event in which the braking force is rapidly cycled to reapply and relieve brake pressure to limit wheel slippage while continuing to adequately decelerate the vehicle.

To actuate the disc brake assembly 10, the driver of the vehicle depresses the brake pedal to generate an electrical signal in the same manner as described above. The electrical signal actuates the motor 42 to bring the motor 42 up to operating speed. The clutch 104 is then engaged to operatively couple the motor 42 to the output shaft 44 which imparts axial motion to the spindle 43. The axial motion of the spindle 43 causes the engagement of the friction pads 23 and 25 to the friction plates 27 and 28, respectively. To disengage the friction pads 23 and 25 from the friction plates 27 and 28, the clutch 104 is disengaged to uncouple the motor 42 from the output shaft 44. Although the motor 42 may still be rotating, there is no further braking force applied while the clutch 104 is disengaged. If the clutch 104 is then engaged again, the rotational motion of the motor 42 is imparted as an axial motion to the spindle 43 and the friction pads 23 and 25 will move into frictional engagement with the friction plates 27 and 28 of the rotor 26.

Figure 7:
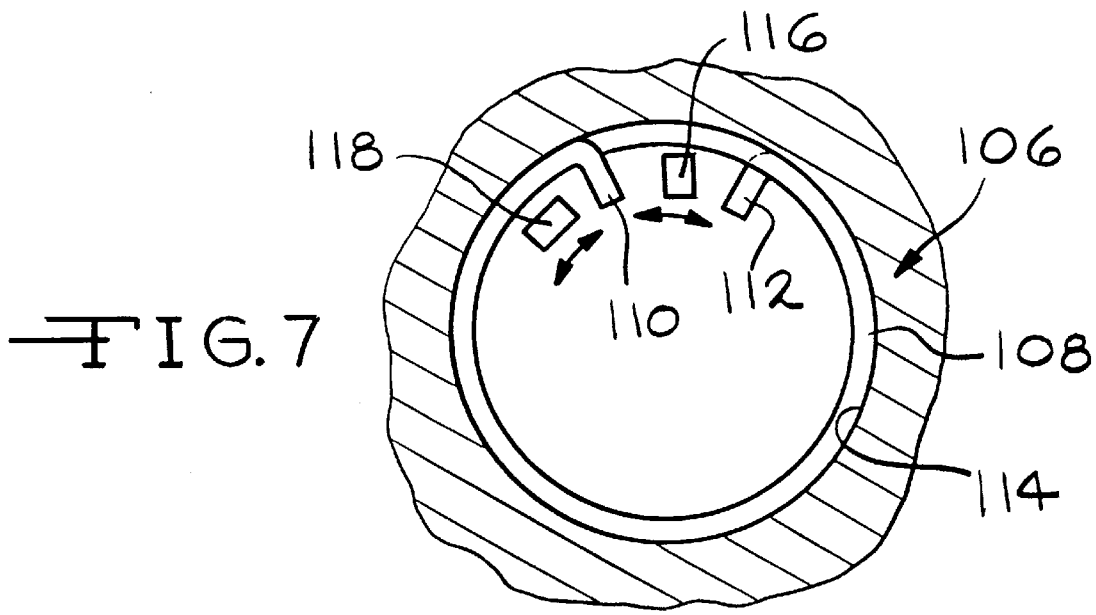
FIG. 7 is a sectional view of a spring wrap brake which can be incorporated into a vehicle disc brake assembly of the present invention.

Under certain conditions it may be desirable to have a mechanism which prevents rotation of the conversion gear assembly when not acted on by the motor 42. For example, when the motor 42 is deenergized with the brake 10 engaged, pressure from the caliper 11 can cause the conversion gear assembly to be rotated in the direction to move the spindle 43 away from the brake rotor 26. This motion is hereinafter referred to as "back drive motion". If no clutch 104 is provided, or if the clutch 104 is engaged, back drive motion of the conversion gear assembly will cause the motor 42 to move with back drive motion also. As previously indicated, the rotational back drive motion of the conversion gear assembly and the motor 42 can be caused by an axial reactionary force acting on the spindle 43 in an inboard direction (toward the right when viewing FIG. 3). Any suitable mechanism can be used to prevent the rotational back drive motion of the motor 42, such as a spring wrap brake, indicated generally at 106, shown schematically in FIG. 7.

The spring wrap brake 106 includes a helical coil wire spring 108 having a pair of tangs 110 and 112 formed at the opposed ends of the spring 108. When the spring 108 is in the relaxed state, the spring 108 expands outwardly and frictionally engages a cylindrical surface 114, such as a cylindrical inner wall surface of the housing 41. The spring wrap brake 106 further includes an output member 116 which can be attached or incorporated onto the output shaft 44 so that rotation of the output shaft 44 rotates the output member 116. The spring wrap brake 106 also includes an input member 118 which is attached or incorporated onto a drive shaft (not shown) of the motor 42 so that actuation of the motor 42 rotates the input member 118. Note that to incorporate the spring wrap brake 106 to the disc brake assembly 10, the output shaft 44 will have to be modified so that the motor 42 is not directly coupled to the output shaft 44.

For operation of the disc brake assembly 10 incorporating the spring wrap brake 106, the motor 42 is actuated, thereby causing rotation of the input member 118. The input member 118 rotates until it contacts and pushes on either the tang 110 or the tang 112, depending on the direction of rotation, thereby causing contraction of the coils of the spring 108. The frictional contact between the spring 108 and the cylindrical surface 114 is thereby reduced. After a small rotation, the tang 110 or 112 contacts the output member 116. The input member 118 pushes either the tang 110 or the tang 112 against the output member 116 to cause rotation of the output shaft 44, thereby actuating the disc brake assembly 10. When the motor is deenergized, the rotation of the input member 118 will be terminated, thus removing the force being applied to the tang 110 or 112. The coils of the spring 108 expands outwardly to frictionally engage the cylindrical surface 114. Axial reactionary forces acting on the spindle 43 can cause the output shaft 44 to rotate. The output shaft 44 rotates a small amount until the output member 116 contacts and pushes against the tang 110 or 112. The pushing of the tang 110 or 112 will urge the coils of the spring 108 to expand outwardly, thereby increasing the frictional engagement of the cylindrical surface 114 and the spring 108. The frictional engagement prevents the tang 110 or 112 to move against the input member 118, thereby preventing rotational back drive motion of the motor 42.

Figure 8:
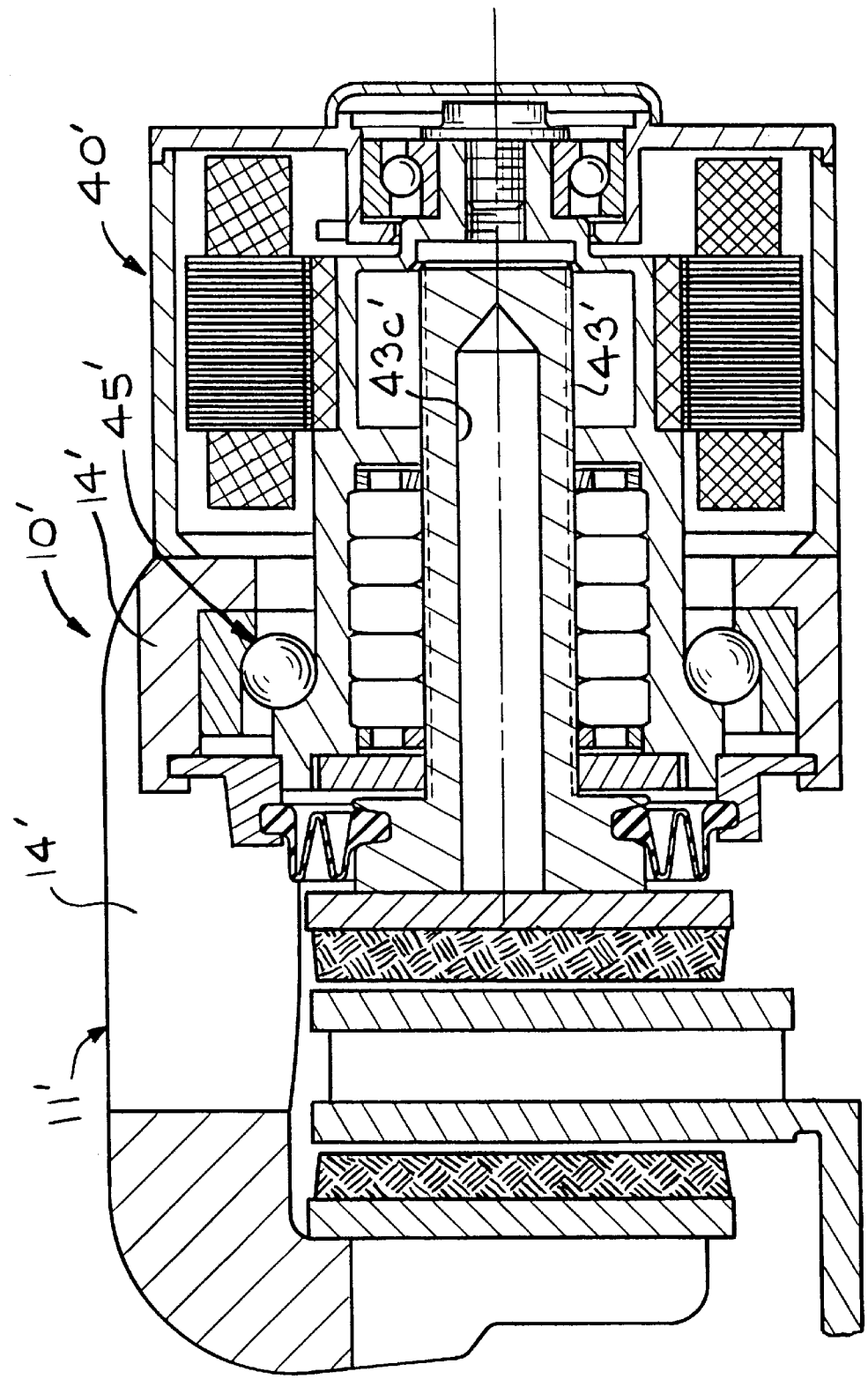
FIG. 8 is a sectional view similar to FIG. 3 showing another embodiment of a vehicle disc brake assembly and electrical actuation mechanism of this invention.

FIG. 8 illustrates another embodiment of a portion of a disc brake assembly 10', of this invention, generally similar to the disc brake assembly 10 of FIGS. 1 through 3. The disc brake assembly 10' includes a caliper 11' and an electrical actuation mechanism 40'. The caliper 11' has a bridge portion 14' having an integrally formed portion 14a' for supporting a bearing 45'. As a result, the electrical actuation mechanism 40' can have a smaller housing 41' compared to the housing 41 of the electrical actuation mechanism 40 of FIG. 3. Since the caliper bridge portion 14' supports the bearing 45', the high axial brake forces produced during braking are transmitted to the caliper 11' and not to the fasteners which are used to secure the housing 41 to the caliper 11 of the electrical actuation mechanism 40.

The disc brake assembly 10' also includes a spindle 43' having an axially extending aperture 43c' formed therein. The aperture 43c' reduces the weight of the spindle 43' compared to the spindle 43 of FIG. 3, thereby reducing the total weight of the disc brake assembly 10'.

Figure 9:
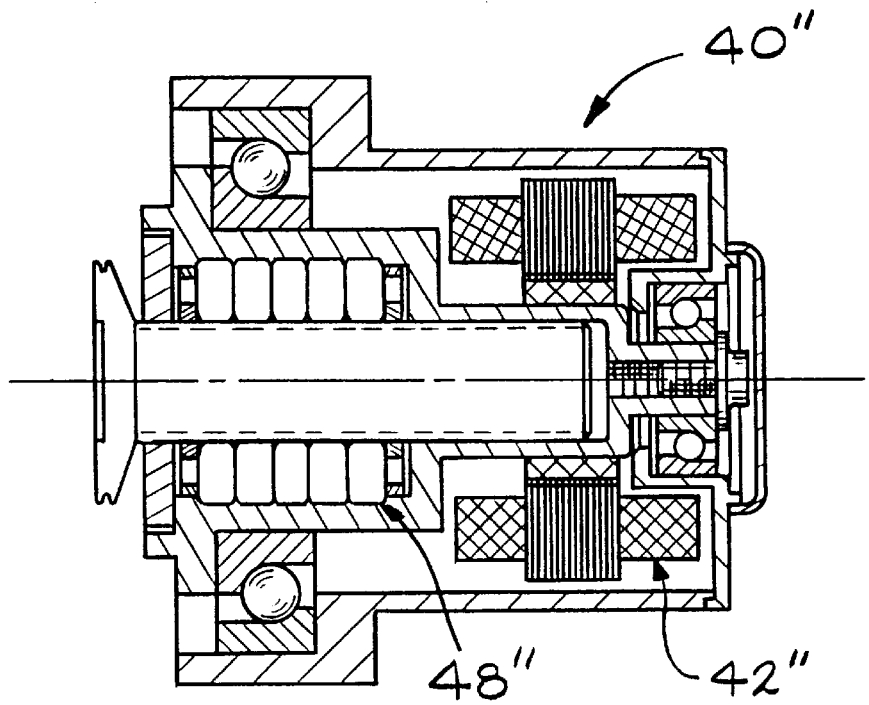
FIG. 9 is a sectional view showing another embodiment of an electrical actuation mechanism of this invention.

FIG. 9 illustrates another embodiment of an electrical actuation mechanism 40", of this invention, generally similar to the electrical actuation mechanism 40 of FIG. 3. The electrical actuation mechanism 40" includes a motor 42" which is spaced slightly farther away from a plurality of planetary rollers 48" so that the internal diameter of the motor 42" can be sized smaller compared to the motor 42 of FIG. 3. The advantage of a smaller motor 42" is a reduction in the weight of the disc brake assembly 40".

Figure 10:
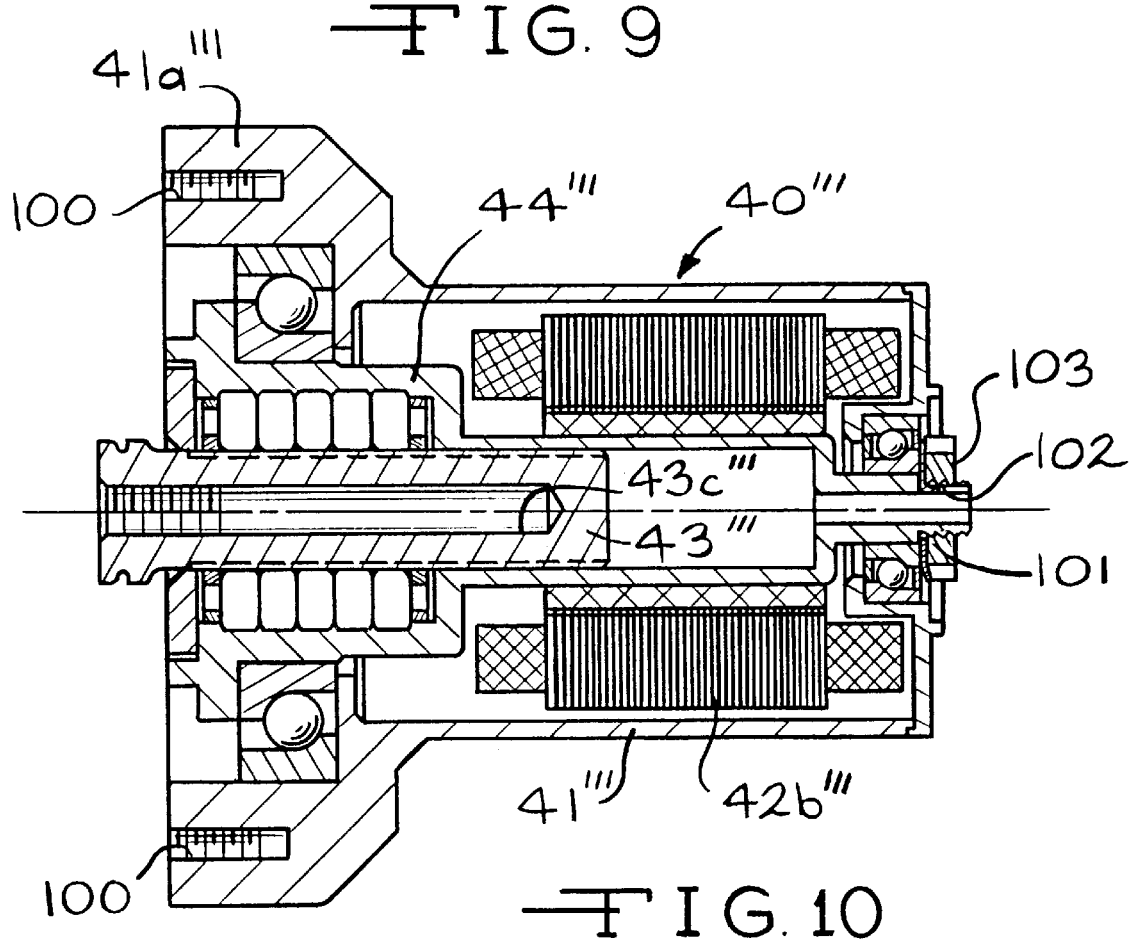
FIG. 10 is a sectional view showing another embodiment of an electrical actuation mechanism of this invention.

FIG. 10 illustrates another embodiment of an electrical actuation mechanism 40'", of this invention, generally similar to the electrical actuation mechanism 40 of FIG. 3. The electrical actuation mechanism 40'" includes a housing 41'" having an enlarged outboard end 41a'". The outboard end 41a'" of the housing 41'" has a plurality of threaded apertures 100 (only two apertures 100 are shown) formed in the housing 41''' and are adapted to receive threaded fasteners (not shown) for securing the housing 41''' to a caliper (not shown). The electrical actuation mechanism 40''' also includes an output shaft 44''' having an external threaded portion 101 on the inboard end thereof. The external threaded portion 101 is received in respective internally threaded bore 102 of a nut 103, performing the same function as the screw 56 of the disc brake assembly 40 of FIG. 3. The electrical actuation mechanism 40''' includes a motor 42''' having a stator 42b''', wherein the axial length of the stator 42b''' is longer than the axial length of the stator 42b of the electrical actuation mechanism 40 of FIG. 3. Note that the stator 42b or 42b''' can be any suitable size to provide for the desired torque output of the motor 42 or 42'''.

Figure 11:
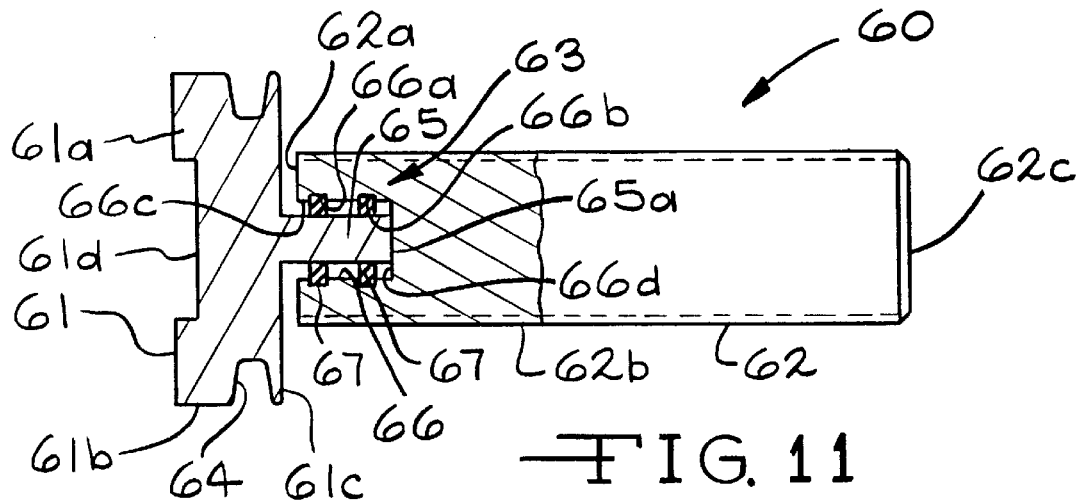
FIG. 11 is a sectional view showing an alternate embodiment of a spindle for use in the electrical actuation mechanism of this invention.

FIG. 11 illustrates another embodiment of a spindle, indicated generally at 60, adapted for use in the electrical actuation mechanisms 40, 40', 40", and 40''' of this invention. The spindle 60 includes a piston 61 which is operatively coupled to a shaft 62 by a dampening structure, indicated generally at 63, so as to move axially with the shaft 62 when the disc brake assembly 10 is actuated. The piston 61 includes an annular recess 61d formed in an outboard end surface 61a thereof, and an annular recess 64 provided in a side surface 61b thereof. The piston 61 further includes an axially extending projection 65 which extends inwardly relative to an inboard end surface 61c thereof. The projection 65 is provided with a generally flat inboard end surface 65a.

The shaft 62 includes an outboard end surface 62a, a side surface 62b, and an inboard end surface 62c. A recess 66 is formed in the outboard end surface 62a of the shaft 62 and extends inwardly toward the inboard end surface 62c of the shaft 62. In the illustrated embodiment, the recess 66 includes a pair of spaced apart annular grooves 66a and 66b formed in an inner wall 66c thereof. The dampening structure 63 can be any suitable structure which resiliently radially supports the piston 61 relative to the shaft 62 of the spindle 60. As shown in FIG. 11, the dampening structure 63 can include an elastomeric member 67 disposed in each of the annular grooves 66a and 66b of the shaft 62 which engage the outer side wall of the projection 65 of the piston 61. Although two elastomeric members 67 are illustrated in FIG. 11, it should be understood that a single elastomeric member or any multiple thereof is contemplated to be within the scope of the invention.

The inboard end surface 65a of the projection 65 engages an inner end wall 66d of the recess 66. The inboard end surface 61c of the piston 61 is spaced apart from the adjacent outer end surface 62a of the shaft 62. When the disc brake assembly 10 is actuated to advance the shaft 62 of the spindle 60 in a direction leftward when viewing FIG. 11, the axial braking force from the axial movement of the shaft 62 is transmitted directly to the piston 61 via the contact between the end surface 65a of the projection 65 and the inner end wall 66d of the recess 66 of the shaft 62. Although the majority of the braking force is transmitted axially, radial forces can act on the components of the disc brake assembly 10. The radial forces can be produced by the brake shoe 20 frictionally engaging the rotating rotor 26. In the illustrated brake assembly 10, the brake shoe 20 is generally fixed with respect to the caliper 11 by the engagement of the notches 22a and 22b formed in the backing plate 22 with the guide rails 17a and 18a, respectively, of the anchor plate 16. However, any slight gap between the guide rails 17a and 17b and the notches 22a and 22b can result in transmission of radial forces. If the spindle were a one-piece design, such as the spindle 43 of the electrical actuation mechanism 40, the majority of the radial vibrations or forces transmitted to the spindle 43 could be directly transmitted to the planetary rollers 48. This transmitted radial force could cause damage to the external threads 55 formed on the outer surface of the spindle 43, the first and second grooves 53 and 54 formed on the outer surface the planetary rollers 48, and/or the internal threads 47 formed on the spindle nut 44b, thereby decreasing the life of the electrical actuation mechanism 40. Since the piston 61 of the spindle 60 is coupled to the shaft 62 by the dampening structure 63, the piston 61 can move relative to the shaft 62 by compression of the elastomeric members 57 when acted upon by a radial force. Thus the elastomeric members 57 reduce the transmission of potentially damaging radial forces from the piston 61 to the shaft 62 of the spindle 69. The potential relative movement between the piston 61 and the spindle 69, and thus the compression of the elastomeric members 57, will generally be small due to the relatively small gap between the guide rails 17a and 17b and the notches 22a and 22b.

The recess 61d formed in the outboard end surface 61a of the piston 61 provides for a pressure distribution area concentrated on the circumferential outer marginal edge of the outboard end surface 61a of the piston 61. The existence of the recess 61d helps to evenly distribute the axial braking force applied to the backing plate 22 of the inboard brake shoe 20 (FIG. 3) over a large area of the friction pad 23, so that the friction pad 23 will wear evenly when engaging the rotor 26.

In the embodiment of the spindle 60 shown in FIG. 11, the piston 61 and the shaft 62 are formed of the same material, steel. However, the piston 61 and the shaft 62 can be formed from different materials, such as for example, the shaft 62 can be formed from steel and the piston 61 can be formed from a phenolic, resin or plastic material. A piston 61 formed of a non-metallic material can be advantageous to help isolate the bearing 45, the planetary rollers 48, the spindle 43, the output shaft 44, and other components on the disc brake assembly 10 from the high temperatures generated by the friction engagement of the friction pads 23 and 25 and the rotor 26, especially if the disc brake assembly 10 is a permanently sealed structure filled a lubricant which is susceptible to deterioration from prolonged exposure to high temperatures.

Figure 12:
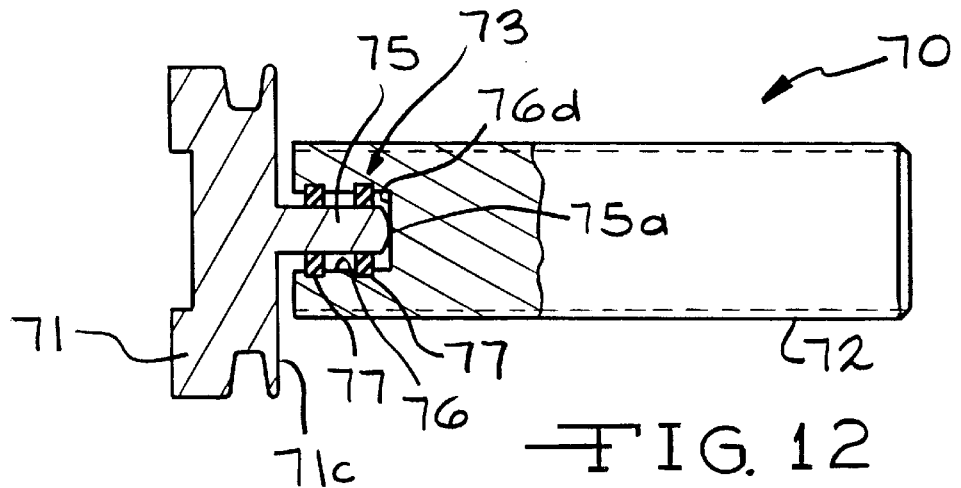
FIG. 12 is a sectional view similar to FIG. 11 showing another embodiment of a spindle for use in the electrical actuation mechanism of this invention.

FIG. 12 illustrates another embodiment of a spindle, indicated generally at 70, and is similar to the spindle 60 of FIG. 11. The spindle 70 includes a piston 71. The piston 71 is operatively coupled to a shaft 72 by a dampening structure 73. The dampening structure 73 includes a pair of elastomeric members 77, similar to that of the spindle 60. The elastomeric members 77 act as a damping structure for limiting the transmission of radial forces from the piston 71 to the shaft 72. The shaft 72 is formed with a recess 76 in the axially outer face thereof. The recess 76 has a generally flat inner wall 76d. The piston 71 includes an axially extending projection 75 which extends inwardly into the recess 76 of the shaft 72 . The projection 75 is provided with a rounded inboard end surface 75a which engages the inner end wall 76d of the recess 76.

Figure 13:
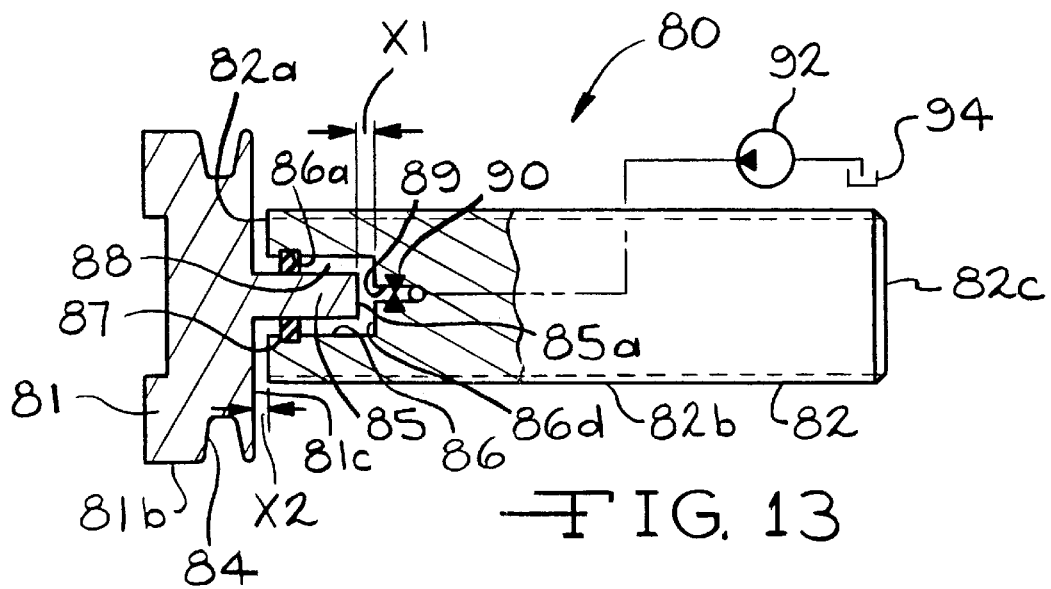
FIG. 13 is a sectional view similar to FIG. 11 showing another alternate embodiment of a spindle for use in the electrical actuation mechanism of this invention.

FIG. 13 illustrates another embodiment of a spindle, indicated generally at 80, adapted for use in the electrical actuation mechanisms 40, 40', 40", and 40''' of this invention. The spindle 80 includes a piston 81 which is operatively coupled to a shaft 82. The piston 81 includes an annular recess 84 provided in a side surface 81b thereof, and an axially extending projection 85 which extends inwardly relative to an inboard end surface 81c thereof.

The shaft 82 includes an outboard end surface 82a, a side surface 82b, and an inboard end surface 82c. A recess 86 is formed in the outboard end surface 82a of the shaft 82 and extends inwardly toward the inboard end surface 82c of the shaft 82. In the illustrated embodiment, the recess 86 includes an annular groove 86a formed therein. An elastomeric seal or member 87 is disposed in the annular groove 86a of the shaft 82 and sealingly engages the outer side wall of the projection 85 of the piston 81. The recess 86, elastomeric member 87, and the projection 85 define a sealed fluid chamber 88 for receiving a fluid (not shown). Any suitable fluid can be used, such as for example, hydraulic brake fluid, silicon, or gel.

As shown in FIG. 13, an inboard end surface 85a of the projection 85 is spaced apart from an inner end wall 86d of the recess 86 by a distance X1, and the inboard end surface 81c of the piston 81 is spaced apart from the adjacent outer end surface 82a of the shaft 82 by a distance X2 which is preferably greater than or equal to the distance X1. The shaft 82 further includes a passageway 89 formed therein for connecting the chamber 88 to atmosphere. A valve 90 is disposed in the passageway 89 and prevents the fluid from flowing out of the chamber 88 to atmosphere.

When the disc brake assembly 10 is actuated to advance the shaft 82 of the spindle 80 in a direction leftward when viewing FIG. 11, the axial braking force from the axial movement of the shaft 82 is transmitted directly to the piston 61 via the fluid within the chamber 88. The volume of fluid within the chamber 88 is kept relatively constant during actuation of the disc brake assembly 10 incorporating the spindle 80. Since the piston 81 is coupled to the shaft 82 via the fluid within the sealed chamber 88 and the piston 81 can move independently from the shaft 82, the fluid within the chamber 88 reduces the transmission of the radial forces acting on the piston 81.

In the event that power is not available to release the disc brake assembly 10 from its applied position, the valve 90 can be actuated to allow the fluid to flow from the chamber 88, thereby allowing the piston 81 to move axially to the right, as viewing FIG. 13, by the distance X1. The distance X1 is preferably sufficient to allow the friction pads 23 and 25 to be moved from engagement with the opposed friction plates 27 and 28, respectively, of the rotor 26. If desired, a source of fluid, such as a pump 92 and a reservoir 94, can be in fluid communication with the passageway 89 so that fluid can be permitted to flow back in the chamber 88 through the valve 90, for example, when power is restored. Furthermore, addition of fluid to the chamber 88 can compensate for wear of the friction pads 23 and 25 in use, thereby allowing the friction pads 23 and 25 to remain a constant distance from the rotor 26 when the spindle 80 is retracted. Keeping the friction pads 23 and 25 a constant distance from the rotor 26 when the is retracted means that response time for brake actuation does not increase as the friction pads 23 and 25 wear.

The fluid within the chamber 88 can also act as a barrier against the transmission of heat generated by the frictional engagement of the friction pads 23 and 25 and the rotor 26.

Although the invention has been described and illustrated in the context with a sliding caliper disc brake assembly 10, it will be appreciated that this invention may be used with other types of brake assemblies. For example, this invention may be used in a fixed caliper disc brake assembly, and in a drum brake assembly.

The principle and mode of operation of this invention have been described and illustrated in its preferred embodiment. However, it must be understood that this invention may be practiced otherwise than as specifically explained and illustrated without departing from its spirit or scope.

What is claimed is:

1. An apparatus comprising:
   a motor for imparting rotary motion;
   a shaft having a recess in one end;
   a conversion gear assembly operatively connecting said motor to said shaft, said conversion gear assembly converting the rotary motion of said motor to axial motion of said shaft;
   a piston having a projection disposed within said recess of said shaft; and
   a dampening structure operatively connecting said projection on said piston to said shaft so that said piston can move relative to said shaft, said dampening structure dampening transmission of any radial force acting on said piston to said shaft, said dampening structure comprising a first elastomeric member circumferentially disposed about said projection and seated within an annular groove in said recess to resiliently and radially support said projection.

2. The apparatus of claim 1, wherein
   said projection has an end surface that is in contact with an end wall of said recess of said shaft.

3. The apparatus of claim 2, wherein
   said end surface of said projection and said end wall of said recess are generally flat.

4. The apparatus of claim 2, wherein said end wall of said recess is generally flat and said end surface of said projection is rounded.

5. The apparatus of claim 1, wherein
   said dampening structure includes a second elastomeric member engaging said shaft and said piston, and
   compression of said first elastomeric member and second elastomeric member dampens transmission of radial forces acting on said piston to said shaft.

6. The apparatus of claim 1, wherein said conversion gear assembly includes:
   a spindle nut having internal threads, said spindle nut operatively connected to said motor; and
   a plurality of planetary rollers each having formed on its outer surface first parallel grooves having a first pitch and
   second parallel grooves having a second pitch, where said first pitch is greater than said second pitch,
   said first parallel grooves engage said internal threads of said spindle nut, and
   said second parallel grooves are engaged with external grooves formed on said shaft.

7. The apparatus of claim 1, wherein said piston is made of a phenolic material.

8. The apparatus of claim 1 incorporated into a disc brake assembly that comprises:
   a rotor adapted to be connected to a vehicle wheel for rotation therewith;
   a caliper, operatively connected to said piston, said caliper comprising
   an inboard leg supporting an inboard friction pad,
   an outboard leg supporting an outboard friction pad, and
   an intermediate bridge portion interconnecting and supporting said inboard leg and said outboard leg in an operative position surrounding a portion of said rotor.

9. An apparatus comprising:
   a motor for imparting rotary motion;
   a shaft;

a conversion gear assembly operatively connecting said motor to said shaft, said conversion gear assembly converting rotary motion of said motor to axial motion of said shaft;

a piston; and a seal sealingly engaged with said shaft and said piston, said shaft, said piston, and said seal defining a fluid chamber capable of containing a constant volume of fluid, thereby coupling said piston to said shaft so that said piston can move relative to said shaft where said shaft further defines an opening providing communication through said shaft into said chamber, said apparatus further including a valve for selectively preventing fluid from escaping said fluid chamber through said opening.

10. The apparatus of claim 9 further including a source of fluid in fluid communication with said chamber through said opening such that fluid can be permitted to enter or exit said chamber through said valve.

11. The apparatus of claim 9, wherein said shaft has a recess formed therein, said piston include a projection disposed within said recess of said shaft, said recess, said projection and said seal defining said chamber.

12. The apparatus of claim 9, wherein said conversion gear assembly includes:

a spindle nut having internal threads, said spindle nut operatively connected to said motor; and a plurality of planetary rollers each having formed on its outer surface;

first parallel grooves having a first pitch and second parallel grooves having a second pitch, where said first pitch is greater than said second pitch, said first parallel grooves engage said internal threads of said spindle nut, and said second parallel grooves are engaged with external grooves formed on said shaft.

13. The apparatus of claim 9 further including a disc brake assembly comprising:

a rotor adapted to be connected to a vehicle wheel for rotation therewith;

a caliper including an inboard leg, an outboard leg, and an intermediate bridge portion; and a friction pad operatively connected to said piston.

14. A disc brake assembly comprising:

a rotor adapted to be connected to a vehicle wheel for rotation therewith;

a caliper including an inboard leg, an outboard leg, and an intermediate bridge portion;

an electrical actuation mechanism secured to said inboard leg of said caliper, said electrical actuation mechanism including a housing, an electrical motor disposed in said housing, and a spindle disposed in said housing and operatively coupled to said motor by a conversion gear assembly which is effective to convert rotary motion generated by said motor into axial movement of said spindle;

a sensor for sensing the rotation of said motor;

a clutch mechanism adapted to couple and uncouple said motor from said spindle by movement to, respectively, an engaged position and a disengaged position; and a spring wrap brake for preventing movement of said spindle when said motor is not engaged, said spring wrap brake is movable between an engaged, position, wherein movement of said spindle is prevented, and a disengaged position, wherein movement of said spindle is permitted, said spring wrap brake operatively coupled to said motor through said clutch for movement to said disengaged position by rotating motion of said motor when said clutch is engaged.

* * * * *